United States Patent
Thakur

(10) Patent No.: US 10,101,164 B2
(45) Date of Patent: Oct. 16, 2018

(54) ROUTE OPTIMIZATION SYSTEM AND METHODS OF USE THEREOF

(71) Applicant: Aayush Thakur, Memphis, TN (US)

(72) Inventor: Aayush Thakur, Memphis, TN (US)

(*) Notice: Subject to any disclaimer, the term of this patent is extended or adjusted under 35 U.S.C. 154(b) by 467 days.

(21) Appl. No.: 14/885,468

(22) Filed: Oct. 16, 2015

(65) Prior Publication Data

US 2016/0109251 A1   Apr. 21, 2016

Related U.S. Application Data

(60) Provisional application No. 62/064,617, filed on Oct. 16, 2014.

(51) Int. Cl.
| | |
|---|---|
| *G01C 21/00* | (2006.01) |
| *G01C 21/34* | (2006.01) |
| *G01C 21/36* | (2006.01) |
| *G06Q 10/08* | (2012.01) |

(52) U.S. Cl.
CPC ....... *G01C 21/3415* (2013.01); *G01C 21/343* (2013.01); *G01C 21/3667* (2013.01); *G01C 21/3697* (2013.01); *G06Q 10/08345* (2013.01)

(58) Field of Classification Search
CPC .............. G01C 21/3415; G01C 21/343; G01C 21/3667; G01C 21/3697; G06Q 10/08345
See application file for complete search history.

(56) References Cited

U.S. PATENT DOCUMENTS

| | | |
|---|---|---|
| 7,716,077 B1 | 5/2010 | Mikurak |
| 9,014,876 B2 | 4/2015 | Mason et al. |
| 9,037,406 B2 | 5/2015 | Mason et al. |
| D732,049 S | 6/2015 | Amin |
| 9,068,852 B2 | 6/2015 | Mason et al. |
| 9,088,888 B2 | 7/2015 | Duan et al. |
| 9,140,567 B2 | 9/2015 | Fryer et al. |
| 9,141,266 B2 | 9/2015 | McCormick et al. |
| 9,953,539 B1 * | 4/2018 | Gkiotsalitis ............ G08G 1/202 |
| 9,973,887 B2 * | 5/2018 | Harding .................. H04W 4/02 |
| 2010/0057340 A1 * | 3/2010 | Kravets .............. G01C 21/3484 701/416 |
| 2013/0132140 A1 | 5/2013 | Amin et al. |
| 2013/0132246 A1 | 5/2013 | Amin et al. |
| 2014/0046585 A1 | 2/2014 | Morris, IV et al. |
| 2015/0006430 A1 * | 1/2015 | Ben-Alexander .... G06Q 10/109 705/337 |

* cited by examiner

*Primary Examiner* — Hussein Elchanti
(74) *Attorney, Agent, or Firm* — Kagan Binder, PLLC

(57) ABSTRACT

A vehicle asset and route optimization system and method are provided for enabling vehicle route optimization based on, for example, substitution driver availability, trip cost, and trip schedule and available truck/trailer assets. The optimization system allows for weighing the prioritization factors provided by the various users so as to allocate priority among the most desirable inputs to increase efficiency in the shipping function and in vehicle asset usage and management, particularly in cases of unused excess trailer capacity and the reduction of driver downtime in the entire transportation process.

20 Claims, 6 Drawing Sheets

| Codes | | | Defined | | |
|---|---|---|---|---|---|
| Shipper | Carrier | Driver | Shipper | Carrier | Driver |
| S1 | C1 | D1 | In-house Shipment Demand | In-House Truck Asset | In-House Driver Asset |
| S2 | C1 | D1 | External Shipment Demand | In-House Truck Asset | In-House Driver Asset |
| S1+S2 | C1 | D1 | In-house AND External Shipment Demand | In-House Truck Asset | In-House Driver Asset |
| S1 | C2 | D1 | In-house Shipment Demand | External Truck Asset | In-House Driver Asset |
| S2 | C2 | D1 | External Shipment Demand | External Truck Asset | In-House Driver Asset |
| S1+S2 | C2 | D1 | In-house AND External Shipment Demand | External Truck Asset | In-House Driver Asset |
| S1 | C1+C2 | D1 | In-house Shipment Demand | In-house AND External Truck Asset | In-House Driver Asset |
| S2 | C1+C2 | D1 | External Shipment Demand | In-house AND External Truck Asset | In-House Driver Asset |
| S1+S2 | C1+C2 | D1 | In-house AND External Shipment Demand | In-house AND External Truck Asset | In-House Driver Asset |
| S1 | C1 | D2 | In-house Shipment Demand | In-House Truck Asset | External Driver Asset |
| S2 | C1 | D2 | External Shipment Demand | In-House Truck Asset | External Driver Asset |
| S1+S2 | C1 | D2 | In-house AND External Shipment Demand | In-House Truck Asset | External Driver Asset |
| S1 | C2 | D2 | In-house Shipment Demand | External Truck Asset | External Driver Asset |
| S2 | C2 | D2 | External Shipment Demand | External Truck Asset | External Driver Asset |
| S1+S2 | C2 | D2 | In-house AND External Shipment Demand | External Truck Asset | External Driver Asset |
| S1 | C1+C2 | D2 | In-house Shipment Demand | In-house AND External Truck Asset | External Driver Asset |
| S2 | C1+C2 | D2 | External Shipment Demand | In-house AND External Truck Asset | External Driver Asset |
| S1+S2 | C1+C2 | D2 | In-house AND External Shipment Demand | In-house AND External Truck Asset | External Driver Asset |
| S1 | C1 | D1+D2 | In-house Shipment Demand | In-House Truck Asset | In-House AND External Driver Asset |
| S2 | C1 | D1+D2 | External Shipment Demand | In-House Truck Asset | In-House AND External Driver Asset |
| S1+S2 | C1 | D1+D2 | In-house AND External Shipment Demand | In-House Truck Asset | In-House AND External Driver Asset |
| S1 | C2 | D1+D2 | In-house Shipment Demand | External Truck Asset | In-House AND External Driver Asset |
| S2 | C2 | D1+D2 | External Shipment Demand | External Truck Asset | In-House AND External Driver Asset |
| S1+S2 | C2 | D1+D2 | In-house AND External Shipment Demand | External Truck Asset | In-House AND External Driver Asset |
| S1 | C1+C2 | D1+D2 | In-house Shipment Demand | In-house AND External Truck Asset | In-House AND External Driver Asset |
| S2 | C1+C2 | D1+D2 | External Shipment Demand | In-house AND External Truck Asset | In-House AND External Driver Asset |
| S1+S2 | C1+C2 | D1+D2 | In-house AND External Shipment Demand | In-house AND External Truck Asset | In-House AND External Driver Asset |

ROUTE OPTIMIZATION SYSTEM AND METHODS OF USE THEREOF

PRIORITY CLAIM

The present nonprovisional patent application claims the benefit of and priority to, under 35 USC § 119(e), U.S. Provisional Patent Application No. 62/064,617, filed Oct. 16, 2014, entitled "ROUTE OPTIMIZATION SYSTEM AND METHODS OF USE THEREOF," the entirety of which is incorporated herein by reference.

FIELD OF THE INVENTION

The invention relates to the field of transportation and route selection.

BACKGROUND OF THE INVENTION

The freight transportation industry is a crucial element in the flow of international and domestic trade. In 2006, there were over 26 million trucks on the road in the United States alone. The smallest of operational inefficiencies can quickly amount to billions of dollars of lost profits, lost driver income, and added costs to the consumers. The trucking industry continually strives to identify and implement new approaches that can lead to efficiencies, and in turn, increase profits, decrease costs, and increase consumer savings.

The current state of practice in freight transportation may involve the following three common entities: Shippers, Carriers and Drivers, whose common roles are delineated below: Shipper—Consignor, exporter or seller named in the contract as a party responsible for initiating the shipment and may also bear the shipping costs. Carrier Company that transports goods and/or people by air, land or sea, in its own or chartered vessels or equipment, as is named as the carrier in the contract. Driver—Person responsible for operating the vehicle used to ship the goods, usually employee of the Carriers or private contractor. There are many variations of the interactions, provisions, scale of resources, and responsibilities that can and may occur among some or all of these aforementioned entities in the movement of goods.

Typically, a commercial vehicle owner (CMV) is operating multiple vehicles and may be an owner who does not drive his own vehicle. In the U.S., trucks and drivers may be paired up along the various operating models, for example: 1) a commercial vehicle owner (CMV) owns at least one truck and at least one trailer and may himself be the driver or he contractually pairs up with an employee driver; 2) a CMV owns at least one truck and at least one trailer and contractually pairs up with an independent contractor driver; or 3) a CMV owns a truck and/or a trailer and that equipment is paired with other trucks, trailers, and/or drivers. In many cases a CMV is a carrier and, as outlined above, the carrier may fall within any of the three CMV categories and can range in scale from very small to very large in terms of controlled trucks, trailers, and/or drivers. They may own their own fleet and may also hire their own drivers directly. However, they still may fall within the third aforementioned category where resource needs for trucks, trailers, and/or drivers may extend beyond their own available resources.

It is important to note, though, that a carrier is not always the CMV in a freight shipment transport need. In some cases, a CMV is the shipper themselves that may own their own fleet, and may also hire their own drivers directly. The shipper can range in scale from very small to very large. However, they still may fall within the third aforementioned category where resource needs for trucks, trailers, and/or drivers may extend beyond their own available resources. In these cases, the shipper may choose to leverage external resources (i.e. working with a carrier) for trucks, trailers, and/or drivers to fulfill demand beyond their owned resources.

Factors such as increasing operating costs, tough market competition, driver shortage and stricter regulations have added further economic pressure on CMVs. More frequently, the increased costs in the industry are causing wage pressure on commercial drivers and holders of commercial driving licenses (CDL). Primary vehicle owners, shippers/manufacturers and transportation companies, are pushing for ever leaner operations, while the state and federal agencies overseeing the freight transportation industry are struggling to enforce regulations to maintain safety and address environmental concerns.

One reason for all the above issues is the inefficiencies that exist within the freight transportation system. A great challenge in the industry is addressing the issue of asset under-utilization due to, for example, driver downtime, empty backhauls, and vehicle downtime. There are a number of reasons for the failure to efficiently use the existing capacity, for example: (a) an occasional need for greater capacity causes shippers/manufacturers and commercial operators to buy excess transportation capacity; (b) variations in schedule and destinations traveled create non-matched transportation needs; (c) lack of knowledge of trusted users who could conveniently use this excess capacity; and (d) difficulty in providing an economic benefit to incentivize the vehicle owners to share their excess capacity.

In the United States, commercial motor vehicle drivers (CDL) have driving time, and therefore distance, limitations placed on them for safety reasons. Safety concerns include both the CDL drivers and other drivers on the roads. The rules limit the number of daily and weekly hours spent driving and working, and regulate the minimum amount of time drivers must spend resting between driving shifts. CDL drivers are limited to 11 cumulative hours of driving in a 14-hour period, following a rest period of no less than 10 consecutive hours. Based on these limitations, trucking trips are classified as either "short haul" or "long-haul," depending on the distance and/or time of the route associated with the shipment, and whether the trip is intra-regional or is it national/long distance. Usually, a short-haul trip covers a local area that enables a single driver to leave and return home within a consecutive eleven-hour time span. A long-haul trip does not enable the driver to return home in a single day. Instead, the driver must take a layover break in accordance with the Federal Motor Carrier Safety Administration (FMCSA) (United States Department of Transportation) rules and regulations.

Occasionally, transportation companies buy additional equipment and/or employ additional drivers to comply with those legal requirements. Also, companies may face periodic, e.g., seasonal, spikes in demand in which that additional equipment is used, while it may sit the rest of the time. Shipping schedules can make it difficult to have the right equipment in the right place at the right time, forcing the transport of empty trailers to where they are needed. Sometimes, there is simply no follow-up shipment for backhaul, when the equipment reaches a destination, and an empty truck travel to the next shipment pickup.

SUMMARY

The various embodiments of the invention are directed to a system and a method for creating and/or selecting an optimized freight route based on a plurality of factors, such as, vehicle and driver availability, vehicle operating costs, scheduling, and combinations thereof, in order to maximize asset utilization, e.g., commercial vehicle utilization in parallel with better work-life balance for drivers. There is a need in the industry for increasing the efficiency of asset utilization through route optimization and decoupling the driver and driver employment, from the vehicle or equipment, to create a reliable way to hire and/or substitute drivers along a vehicle route, keep a vehicle going, while providing the drivers with continuous employment and a better work-life balance.

A more effective use of this excess capacity may be tied to finding a reliable and trustworthy use of the equipment, e.g., swapping shipments between companies with equipment in different locations. Companies may also struggle with finding a reliable source of replacement drivers to drive during the mandatory rest periods, because drivers want planned schedules for their driving engagements. Opportunities abound for using excess capacity but having the demand connect with the supply is difficult in such a fragmented market. In a very competitive industry, transportation companies may become protective of their contracts, contacts, and drivers, sometimes to the point where they are willing to maintain excess capacity in order to avoid competition. Employing online client management and shipment ordering systems could lead to the point where the transportation companies and drivers could be decoupled, where the drivers would see steady employment while driving for more than just one employer. This would create a system where the equipment would continue to be used during the mandatory driver downtimes.

For purposes of time, efficiency, and/or convenience, as well as regulatory compliance, it is possible for a transportation company or truck owners to employ multiple drivers that can be substituted along a route to keep a vehicle (or trailer with the goods) moving. For example, a company may deploy a two-driver team, or hire substitute drivers in a specific geographic locale for a predictable route. This substitute driver method works well for corporate entities operating with regular schedules and routes, enabling for repeated substitutions along a regular route. It is possible to create a trucking convoy, where drivers are substituted along preset trucking routes to meet the FMCSA limitations. However, this method fails to account for changes in shipment volume or schedules, and may only be applicable to a set, repeatable schedule. Otherwise, transportation companies are employing a single driver for a single vehicle and looking to fill shipments where the driver downtime is also the vehicle downtime, thereby delaying the shipments. In some instances, the shipping company or CMV can hire drivers at nodes or predefined locations along the route to change drivers to keep the shipment moving. The substitution method of freight movement, however, can be cost prohibitive for transportation companies hired for one-time trips. Two-driver teams are significantly more expensive than a single driver operation. As a result of the added expense, vehicles with individual drivers are used more often and the trips are paused, while individual drivers are resting, and this downtime is an often-accepted economic burden on the supply chain. The added cost of the downtime is passed on to the shippers/manufacturers which in turn may pass that on to the end users or consumers.

Without a massive, nationwide, employee workforce and excess capacity, it is impractical to reliably schedule vehicle routes and drivers to avoid the 13 hours of downtime per day. Previously, driver assignment and scheduling for a long-haul route were dependent upon one or two persons completing the entire round trip. A web-based shipping capacity trading system could enable for the exchange of the excess capacity, where the CMV companies would trade shipping jobs to minimize downtime has been proposed to improve efficiencies in the freight hauling industry, Several methods have been tried as well for brokering carrier capacity in which carrier capacity is entered into a transportation database in the form of a list of parameters, which may include: amount of space available, shipment origin and destination, dates and times, rates, and mode of transport (e.g., air, ground, ship, rail, or mixed modal). However, these have failed to mitigate the inefficiencies associated with the mandatory downtime. Requests for available capacity are entered into the transportation database in the form of a list of parameters that define a requested shipment route. Such parameters may include: amount of space required, destination, dates and times, rates, and mode of transport. Mandatory driver time still remains a problem in this type of capacity exchange.

Several embodiments describe passenger-centric methods (such as Uber®)for rating services of taxi and limousine drivers, however, there is a great need for a rating system for independent CMV drivers, which would enable CMV companies to better select drivers for their vehicles. These are very expensive shipments and complex vehicles and finding a qualified driver is a great challenge. The various embodiments of the invention provide configurable solutions to using the unutilized capacity in the industry while minimizing vehicle downtime; schedules substitution of drivers along a route, and provides for continuous and predictable driver schedule, thus solving the problem of excessive downtime and vehicles having to wait for drivers during mandatory rest periods and driver's personal emergencies.

In some embodiments of the invention, a shipper/manufacturer creates a freight trip profile by specifying the origination, destination, pickup date and time, payment offered, carrier and driver ratings, etc. In some embodiments, a vehicle owner creates a trip profile by specifying the origination, destination, delivery schedule, minimum driver qualifications requirements, and the maximum driver pay for the shipment. In some embodiments, the drivers are enabled to create profiles, indicating their experience, location, minimum desired pay, desired direction and schedule of travel. Some embodiments provide for route optimization, yielding vehicle/driver matches to best satisfy the requirements of the vehicle owner and driver profiles.

In some embodiments, the invention enables for the electronic creation and storage of an editable shipper/manufacturer profile; a list of shipping locations/manufacturing facilities, warehouses, etc. (origin and destination); types of goods shipped from/to each location; expected shipping duration for each goods type; offered payment for shipping each goods type; and expected carrier and driver ratings for each goods shipped, etc.

In some embodiments, the invention enables for the electronic creation and storage of an editable vehicle owner profile, where any number of vehicles may be added to the owner profile, creating a vehicle profile for each entry.

In some embodiments, the invention enables the vehicle owner (as well as a shipper, additionally or alternatively) to enter the vehicle profile and create route inquiry, where the vehicle owner designates a trip destination, trip schedule including a date and time window for departure and arrival, maximum allowable budget to compensate the vehicle driver, driver requirements including experience, licenses, and insurance.

In some embodiments, the invention enables for the electronic creation and storage of an editable driver profile, where a driver uploads enters information relating to driving record, experience, licenses, and insurance. In some embodiments, the invention enables for geographic vehicle tracking utilizing methods including global positioning system or cellular tower signal triangulation, whereby the vehicle position is regularly posted to the vehicle profile.

In some embodiments, the invention enables the shipper/manufacturer to enter reviews and ratings into carriers and driver profiles for drivers that the shipper/manufacturer previously used. In some embodiments, the invention enables the vehicle owner to enter reviews and ratings into driver profiles for drivers that the vehicle owner previously used. In some embodiments, the invention enables for third party entry of driving record information including traffic law violations into a driver profile by an authorized third party or a law enforcement agency. In some embodiments, the invention enables the driver to enter the driver profile and create a route inquiry, where the driver designates his geographic location, date range when available to drive, desired end location, desired geographical stops, minimum acceptable payment for the driving.

In some embodiments, the invention enables for vehicle route optimization in response to the owner inquiry and several driver generated inquiries, where route optimization considers driver availability, desired driver end location, driver qualifications and ratings, fuel costs, tolls, downtime, to recommend a vehicle route and driver substitutions along the way. In some embodiments, the invention enables for vehicle route optimization where an individual driver's end location (or a return trip) is included in multiple vehicle route optimizations to lower the trip cost for several vehicle profiles.

BRIEF DESCRIPTION OF THE DRAWINGS

FIG. 5 is a visual display of the various shipping code combinations derived from the shipment fulfillment module.

DETAILED DESCRIPTION OF THE INVENTION

Figure 1A:
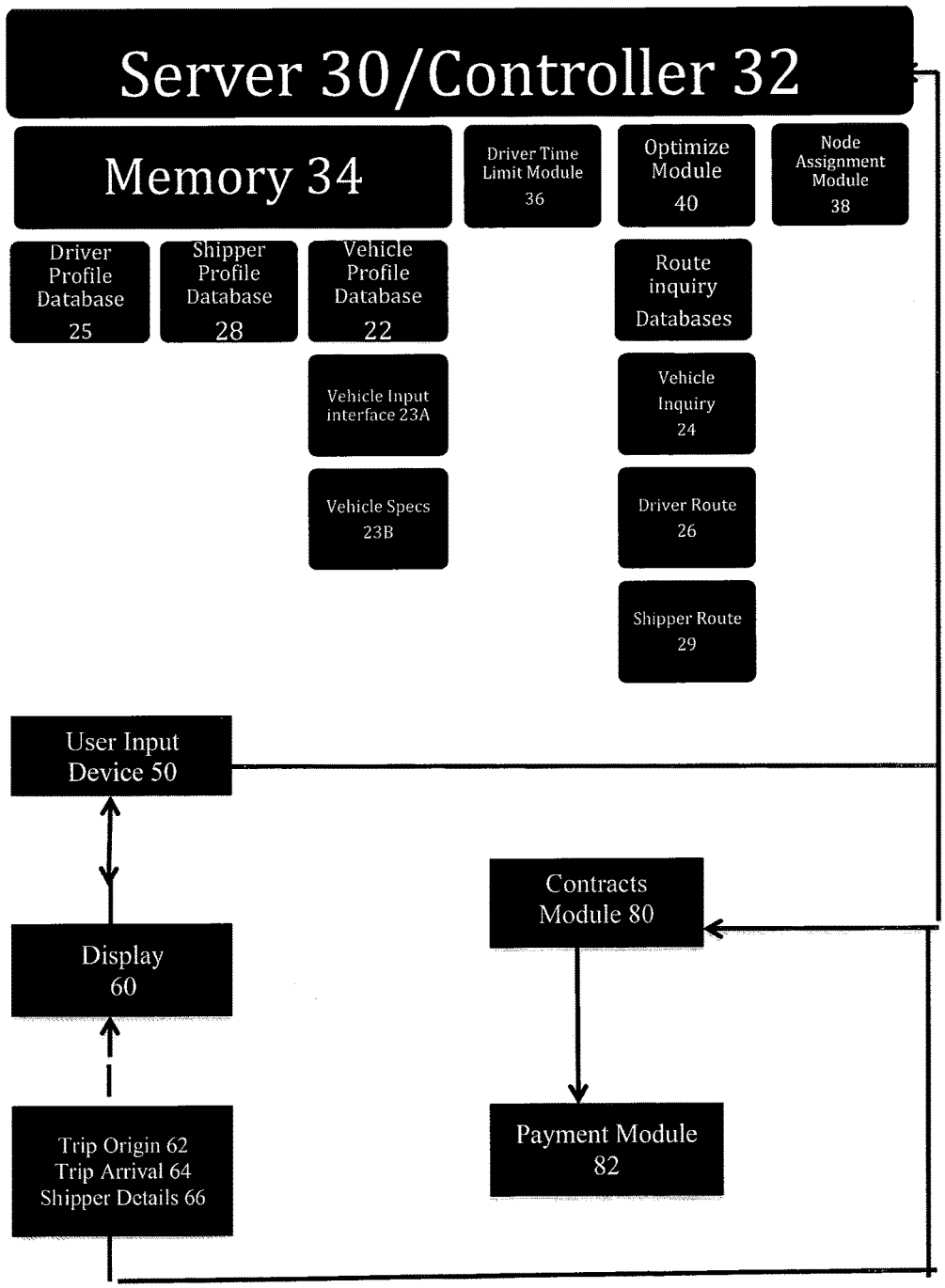
FIG. 1A is a block diagram of a system for vehicle use and route optimization for a vehicle traveling from a first location to a second location according to the teachings herein.

The various embodiments of the invention optimize driving route and asset utilization in, for example, the freight trucking industry by minimizing vehicle downtime, enabling the vehicle owners or shippers to reliably hire independent drivers along a vehicle route and avoid having to stop a vehicle or the load it is carrying during the mandatory driver rest periods. Also, other related embodiments of the optimization system schedule multiple driver engagements to minimize payments for non-driving time or return trips. There are multiple groups involved in the industry that may benefit from the asset and route optimization system of the invention, e.g., vehicle owners, drivers, shippers, manufacturers, and consumers.

The System

The system and method presented provide a means of vehicle asset and route optimization. The optimization may be based on a plurality of calculations derived from both user input and system functionality, e.g., vehicle owner generated route inquiry, available drivers along alternative routes, weather information, fuel prices, tolls, and road conditions. In one example embodiment, the system is comprised of a database, online interface, user inputs for vehicle owners and drivers, a means to submit a route vehicle inquiry, a means to submit a driver route inquiry, and a means to determine the optimal vehicle route based on driver availability, travel distance, travel time, travel costs, road and weather conditions, or other optimization inputs.

In one example embodiment, a system is provided system for vehicle use and route optimization for a vehicle traveling from a first location to a second location, the system including a server or controller configured to receive a plurality of data inputs from one or more databases initiated by a user, the controller including an optimization module, a mapping module and a memory module having stored therein a vehicle profile database, a driver profile database, and a route inquiry database. The controller further includes a configurable driver time limiting module and a node assignment module for assigning one of an originating and arrival geographic location node along a route defined by the first and second location for one of a driver substitution and equipment exchange. The system also includes a user input device operatively coupled to the controller for receiving a vehicle data input, a driver data input and a route inquiry data input from the user; and a visual display unit operatively coupled to the controller and the user input device for displaying output generated from the controller and the user input device. The controller in this system initiates the optimization module to generate at least one vehicle route, at least one driver route with integrated driver time limit and at least one geographic node along one of the vehicle and driver route that is displayed on the display.

In a related embodiment, a method is provided for optimizing individual vehicle use and optimizing a route for a vehicle traveling from a first location to a second location including the steps of providing a controller configured to receive a plurality of data inputs from one or more databases initiated by a user, the controller including an optimization module, a mapping module and a memory module having stored therein a vehicle profile database, a driver profile database, and a route inquiry database, the controller further including a configurable driver time limiting module and a node assignment module for assigning one of an originating and arrival geographic location node along a route defined by the first and second location for one of a driver substitution and equipment exchange. Next the method includes inputting a vehicle data input, a driver data input and a route inquiry data into a user input device operatively coupled to the controller. Finally, the method or process includes displaying at a visual display unit operatively coupled to the controller and the user input device at least one vehicle route, at least one driver route with integrated driver time limit and at least one geographic node along one of the vehicle and driver route received from the controller.

Referring now to FIG. 1A, there is illustrated a system 10 that utilizes a means to input, store, and access user profiles module 20 including an electronic vehicle owner profile 22, specific vehicle sub profile 23A, and a vehicle route inquiry 24. Additionally, the system 10 utilizes a means to input, store, and access an electronic driver profile 25 and a driver route inquiry 26. Via a vehicle information input interface 23A, the system and method presented enable a vehicle owner to enter fixed vehicle requirements 23B into vehicle profile 22, including vehicle make, model, weight, carrying capacity, mileage, average fuel consumption, scheduled service appointments, insurance requirements and driver rating requirements by the system user requesting, for example, only a top rated driver would be enabled to drive a newer vehicle. In a related embodiment, user profiles module includes a shipper profile database 28 and shipper route inquiry 29 to facilitate 2, 3 or multi-party participation in planning and securing shipment fulfillment.

In this example embodiment, system 10 further includes a server 30 having a controller or processor 32 therein and configured with a memory storage unit 34, a driver time limit module 36 and a node location assignment module 38. Server 30 can be anyone of a number of server configurations including, but not necessary limited to, cloud-based and Ethernet-based system which provide connectivity through various networks to the end users of system 10. Drive time module 36 of system 10 is configurable with predefined driving time limits that are controlled by either Federal or State standards or may even be controlled by any of the parties in system 10 in order to promote safety for the driver and those on the road. In one example embodiment, drive time module 36 is configurable to promote a "green" fleet by limiting trips from node to node to 2-4 hour increments (or whatever the user chooses) to take advantage of electric charging (or propane or other temporary fuel) at either end of the trip or at nodes along the way.

Further in asset and route optimization system 10, node location assignment module 38 provides locations along the desired driving or shipping route for convenient driver exchange/substitution or trailer exchange locations for any combination of short or long haul trips. Depending on the needs of the shipper, vehicle owner and driver or drivers, node assignment module 38 provides suggestions or matches that best meet the specified requirements of the participants of system 10. System 10 also includes a user input device 50 that is coupled to server 30 (either hardwire, wirelessly via Bluetooth® or an RF connection or via a cellular network), such as a keyboard, tablet touch screen or smartphone touchscreen or pad or any other device that facilitates data input by a user. A visual display 60 is also coupled to server 30 to display data that is being inputted by any one of the vehicle owner, driver or shipper and received by any of these users.

In this example embodiment, system 10 further includes an optimization module 40 that includes various algorithms, with has access to Mapping Modules (described in FIG. 1B) and Job Profiles (described in FIG. 1B), to be able to initiate matching schemes of vehicles/equipment, drivers and schedules with shipment needs described in the various Job Profiles. Trip origination 62, trip arrival/destination 64 and shipper details are all processed and displayed on either display 60 or can be sent to a remote viewer such as a smartphone or other smart device. Once the shipper receives the various proposed matching routes and accepts at least one proposal, then a contracts module 80 generates a proposal for acceptance by the shipper, driver and vehicle owner. A payment module 82 is initiated upon acceptance of the contract by all of the parties to set up payment plans for all parties involved in a particular transaction.

In practice, system 10 enables the vehicle owner to create a vehicle route inquiry, based on the vehicle profile and the owner-input trip variables, including a time window for the trip origination 62, time window for the arrival 64, weight of the vehicle and any included load, owner input fuel cost per mile traveled estimate, and the maximum available payment for the driver(s). The system and method presented further enable the vehicle owner (and shipper) to weight the specific inputs, so that an optimization more closely meets some of the inputs, while the owner may be more flexible with other inputs. For example, for a specific route inquiry, meeting a time restriction may be weighted more in the optimization scheme than meeting a cost restriction, while another optimization plan may be more weighted in favor of meeting a cost restriction.

System 10 also enables the driver to create a driver route inquiry based on, for example, driver profile, desired minimum and/or maximum trip duration, desired minimum and/or maximum distance traveled, desired stops and stop time windows, pay rate, and total compensation. In addition, the driver can weigh the specific inputs, so that an optimization plan more closely meets some of the inputs, while the driver may be more flexible with other inputs. Further, system 10 enables a user to compare the vehicle route requirements to the driver route requirements, creating a list of acceptable vehicle routes plans utilizing several available drivers, where the routes are ranked according to distance traveled, travel time, minimal downtime, timing of next available shipment where shipper inquiries are included, minimal driver cost—presenting the vehicle owner with several route selections optimized for trip time and trip cost.

In a related embodiment, system 10 enables the vehicle owner to rate all of the utilized drivers at the completion of any trip, a rating which is averaged into a driver rating in the driver profile. Vehicle owners operating more expensive, newer, or more specialized equipment may want to hire drivers with higher ratings, which in turn, might raise the pay scale of the better drivers. On the other hand, a driver would receive direct feedback regarding how to improve their performance and access more desirable trips.

Via the driver profile input interface, such as user input device 50, system 10 enable a driver to create a driver profile, including, e.g., experience, licensure, endorsements, insurance coverage, location. A driver may further specify time and location(s) regarding availability. The system can then determine, for example, the available driving sessions based on the route inquiries, if the driver is returning home or requiring mandatory downtime, and location, and then offer additional trips based thereon enabling drivers to stack driving sessions and minimize unpaid travel.

In a related embodiment, a geo-aware or location tracking system, such as global positioning or mobile device triangulation, may be integrated into system 10 and used to track drivers and/or vehicles to coordinate driver substitution or shipment trailer exchange. In the case of delays, the system may alert the vehicle owner of any delays causing the driver to run up against, e.g., mandatory rest time at a distance far away from a scheduled substitution location, which may necessitate engaging system 10 to, for example, suggest unscheduled substitutions and seek additional drivers in the area while the vehicle is en-route. Additionally, system 10 enables authorized parties to input driver information such as traffic citations or accident reports. The data may be sourced, for example, from the vehicle owners, government/law enforcement, or the insurance companies. The ability to track driver performance and driving records would be a reliable means or resource to adequately match vehicles with skilled drivers and alleviate some of the apprehension associated with hiring independent drivers.

In yet another embodiment, system 10 enables the vehicle owner to select from the list several route selections and electronically offer the routes to one or several of the selected drivers, who then may accept or decline a route. Whenever one of the selected drivers declines a route, that particular route is deleted from the list of available routes. Hence, system 10 enables a weighted optimization plan or proposal that would stack several routes/driving sessions for a driver, to enable a timely arrival at the driver's desired stop or destination. The system also enables a preset response window for an optimization, where the system may request a driver cost reduction, destination change, or a driver schedule change in order to weigh an optimization in a driver's favor and to best meet all of the driver's inputs—the driver would receive an electronic inquiry requesting a change, and that defined inquiry would have a timed response window.

System 10 also enables the generation of routes that deviate from the vehicle owner and driver inputs by a user defined margin. For example, a vehicle owner may define an acceptable deviation for any of the inputs, where the system could then present additional routes for comparison, to offer the owner an opportunity to get a broader selection. For example, an additional day of travel decrease by half the driver cost for a specific trip, but such an arrival time may be outside of the owner input values. In such cases, system 10 provides a recommendation of routes that do not fit driver inputs if the recommended routes exceed the driver defined trip pay by a preset value or percentage or value. For example, a driver may receive a comparable distance-traveled route recommendation that leads to a different destination if the trip pay is more than 30% greater than the driver inquiry. System 10 also receives and integrates input of anticipated weather conditions, road conditions, road construction, fuel cost updates, tolls, or any additional factors affecting travel along the several routes. Such information may be input by using manual entry or automated applications.

In one example embodiment, system 10 integrates a driver rating system, where the vehicle performance (speed, fuel consumption, excessive stopping) is tracked, recorded, compared to an average recorded trip along a said road, and used as a factor in the driver rating. A specific driver style may significantly reduce the fuel consumption when compared to another style. In this example, the driver may receive system-generated recommendations to improve the driver rating such as, for example, increasing the on-time performance by a certain percentage so as to yield a better rating, or reducing the fuel consumption average by a few percent so as to lead to a significant pay rate increase for that specific driver. In a related example embodiment, system 10 provides for a cost calculator, indicating a cost range for a vehicle owner to anticipate the driver expense for the requested trip and can provide for a pay calculator, indicating a pay range for a driver seeking to drive from one location to another. Such a calculator may show pay differences between the driver's present rating and the next rating level up.

Vehicle Owners

Although system 10 is configured for long term planning by the users, the various embodiments of the invention provide can also provide a real-time online platform, especially for smaller shipping jobs or jobs that are territorially less challenging, hence most likely involving fewer variables for system 10 to process. In one example embodiment, system 10 is configurable as an applet or App for use on smaller platforms or smaller shared networks (maybe just within a city or county or even state limit). In such a case, system 10 enables vehicle owners to optimize the trip time and the trip costs for at least one vehicle trip. Hence, the vehicle owner creates a vehicle profile in system 10 using a user input device or interface and enters the vehicle details into the vehicle profile.

Figure 1B:
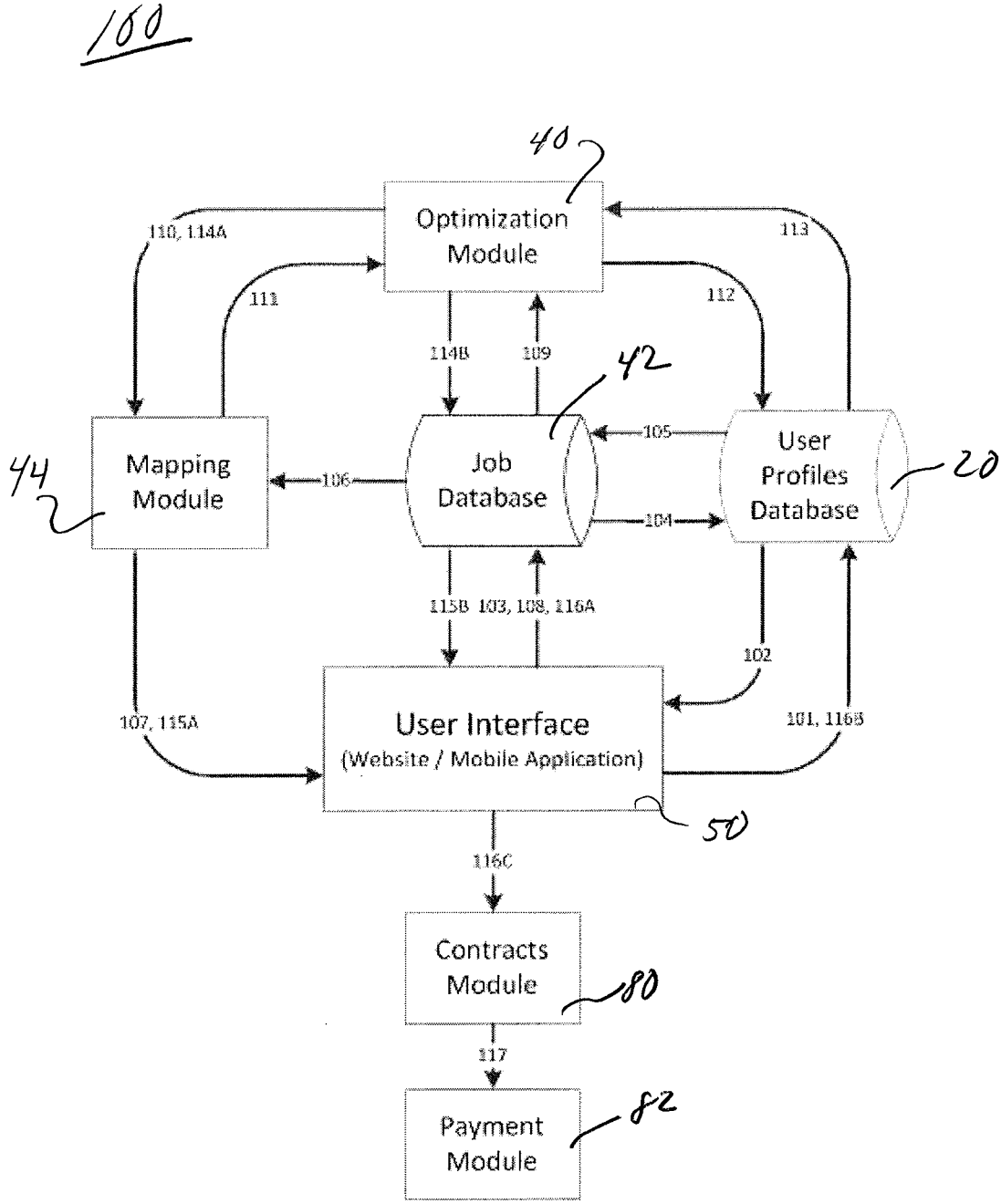
FIG. 1B is a block diagram of an exemplary system for optimizing a vehicle route according to the teachings herein.

FIG. 1B is a block diagram of an exemplary functioning process flow 100 for optimizing a vehicle route according to the invention, illustrating a job database 42 and user profiles 20, inputs which optimization module 40 utilizes to calculate the optimal vehicle use and route, offering employment to an available driver to drive the vehicle (contract module 80), and a job payment module 82 for driver payment. In use, the vehicle owner (or shipper) posts the parameters of a job/trip, such as, origin, destination, type of goods, driver qualification requirements, payment offered, and timing, via the user interface 50 (which in this example embodiment, can also be web-based using a website or an App on a smartphone). In this example embodiment, based on the parameters provided by the vehicle owner, system 10 optimizes the time of a job/trip by: 1) determining a set of several of the shortest routes; 2) identifying the available drivers matching the criteria set forth by the vehicle owner; and 3) optimizes a route by selecting appropriate breakpoints for driver substitution based on the driver availability.

Upon optimizing the job/trip time, process flow 100 (and system 10) moves on to optimize the operating costs. For example, the system selects the best refueling locations based on the daily fuel costs from government and private websites in combination with the vehicle fuel consumption information provided by the vehicle owner. The system also calculates and accounts for the average per mile traveled overhead costs based on the information provided by the vehicle owner, as well as the toll costs for each route option. Optionally, when the system finalizes the costs for each of the routing alternatives, insurance companies for the users can provide trip insurance quotes and then a quote is selected that best meets the user's objectives.

Finally, the system displays a plurality of alternative routes to the vehicle owner (or shipper) and provides the vehicle owner the opportunity to request additional modifications to the search criteria. When the vehicle owner finalizes the preferred parameters, the system provides an offer to each of the drivers matching the job/trip. Upon driver offer acceptance, the system updates the driver's system integrated calendar, and the system generates a contract document (via contracts module 80) for execution by each party in the transaction. In addition to the optimization features of the system, the system may also provide vehicle owners with regular vehicle location tracking updates and estimated times of arrival ("ETA") at breakpoints and/or destinations. Another feature of the system is the generation of a driving report corresponding to each trip segment which enables vehicle owners (and shippers) to rate the driver's performance in the system. The data from these reports can be used for driver rating integration into the driver profiles database.

Referring again to FIG. 1B, an example of vehicle owner optimization process flow 100 of system 10 as described hereinabove, illustrates a vehicle owner who has entered into a contract for a long haul trip which requires 24 hours of on road driving. In the current standard operational setup, the vehicle owner may employ a one or two-driver team to drive the route. In case of one driver, this job/trip takes at least about 49 hours to complete. In the case of a two-driver team, that same job/trip takes about 25 hours to complete. However, the vehicle owner (or shipper) pays for 2 drivers, provides a sleeper cab instead of regular cab, and incurs higher operational costs. In both cases, the drivers may spend several days away from their homes.

For vehicle owners, process flow 100 illustrates the following steps in a vehicle asset and route optimization request by a either a vehicle owner or a shipper: at 101—Users (vehicle owner, shipper or driver) create their profile while vehicle owners register their vehicles with all relevant information. At 102—User information is accessed from the database whenever user logs in to the system and at 103—Vehicle owners post job description—shipment origin, destination, type, weight, delivery window, etc. At 104—preliminary job info saved to the users profile and at 105—All relevant vehicle information is obtained—vehicle type, fuel economy, etc. At 106—job details are sent to mapping module 44 for validation (check valid origin/destination, etc., which is an optional step, only if user wants to check the geo-coded shipment details) and at 107—job details are displayed on map (optional). Next, at 108—user accepts the job description validation and agrees to go ahead (optional). At 109—shipment details are sent to optimization module 40 and at 110—trip origin destination information sent to mapping module. At 111—multiple route options with total drive time, driver switch locations, refuel locations and fuel cost, tolls, weather info, and substitute driver locations are sent to optimization module 40. At 112—route options are saved in user profile 20 for later access.

Next, at 113—profile information for matching drivers by location, cost, criteria, pay, etc. obtained from user database and then at 114A—route options along with total cost (with breakup—fuel, tolls, overhead, etc), driver substitutions, total travel time, etc. are sent for mapping purposes (if user wants to see geo-coded route options), while at 114B—route options along with total cost (with breakup—fuel, tolls, overhead, etc), driver substitutions, total travel time, etc. saved in the job database. At 115A, 115B—all route options are sent to vehicle owner for approval and the drivers notified and at 116A 116B—the selected route option is saved to the job database and user profile. At 116C—the selected route option is sent to contracts module 80 for generating contracts involving the shipping plan. Upon acceptance of contracts by all parties at 117, the payment module 82 charges the vehicle owner for the total trip cost.

Some embodiments of the invention suggest breaking down the trip into 5 segments of 4-6 hours or 4.5 hours each, or ideally legs of 5.5 hours each to end the trip at or below 11 hours, substituting drivers along the route at those intervals, and each driver returning home on another driving assignment. In these embodiments, the job/trip is completed in a regular cab, by 1 effective driver for the entire trip, and for the cost of 1 driver. Moreover, each of the drivers may return home directly after their leg of the trip is completed, e.g., the same day, the job/trip is completed within a 24 hour period. And, the vehicle is immediately available for next assignment, rather than sitting during the mandatory driver downtime.

Drivers

The system has a means of scheduling and matching drivers in which drivers create profiles in the online system 1, in which they provide relevant information, e.g., driving history, license, Compliance, Safety and Accountability (CSA) rating, endorsements, wage expectation, driving hours per day preference, direction of travel, distance, route preference, total trip duration preference. The system may track each driver's location via any available means, e.g., mobile device GPS and/or triangulation tracking. The system offers drivers potential driving engagements based on their configured location. These offers may be real-time and/or may include multiple future driving engagements. Drivers may also utilize the system to inquire on future engagements, e.g., engagements at other locations or times.

For drivers, process flow 100 illustrates the following steps in securing a job from either a vehicle owner or a shipper: at 101—drivers create their profile and they provide all relevant information like license, endorsements, etc. and at 102—the driver as a user access information from the database whenever the driver as a user logs in to system 10. At 103—drivers then post a job inquiry with preferred origin/destination, expected pay and other parameters according to his/her personal preferences. One of the advantages of system 10 is opening of opportunities for women and men that just want to work part-time or want only daily jobs that allows them to come home every night. At 104—a preliminary job information is saved to the users profile and at 105—relevant driver records are accessed from the database. At 106—the driver's inquiry is then sent to mapping module 80 and valid origin/destination and other parameters are check and at 107—open jobs matching search inquiry is displayed on a map via a visual display, such as display 50 or on a smart device.

In addition to scheduling and matching feature for drivers, the system also provides drivers with real-time traffic intelligence while driving, such as, historical traffic congestion locations and times, construction updates, refueling suggestions, breakpoint locations, ETA, weather information. These features are intended to, among other things, provide the flexibility for drivers to create a better work-life balance as well as negotiate wages based on their past performance ratings.

Optimization Module

Figure 2:
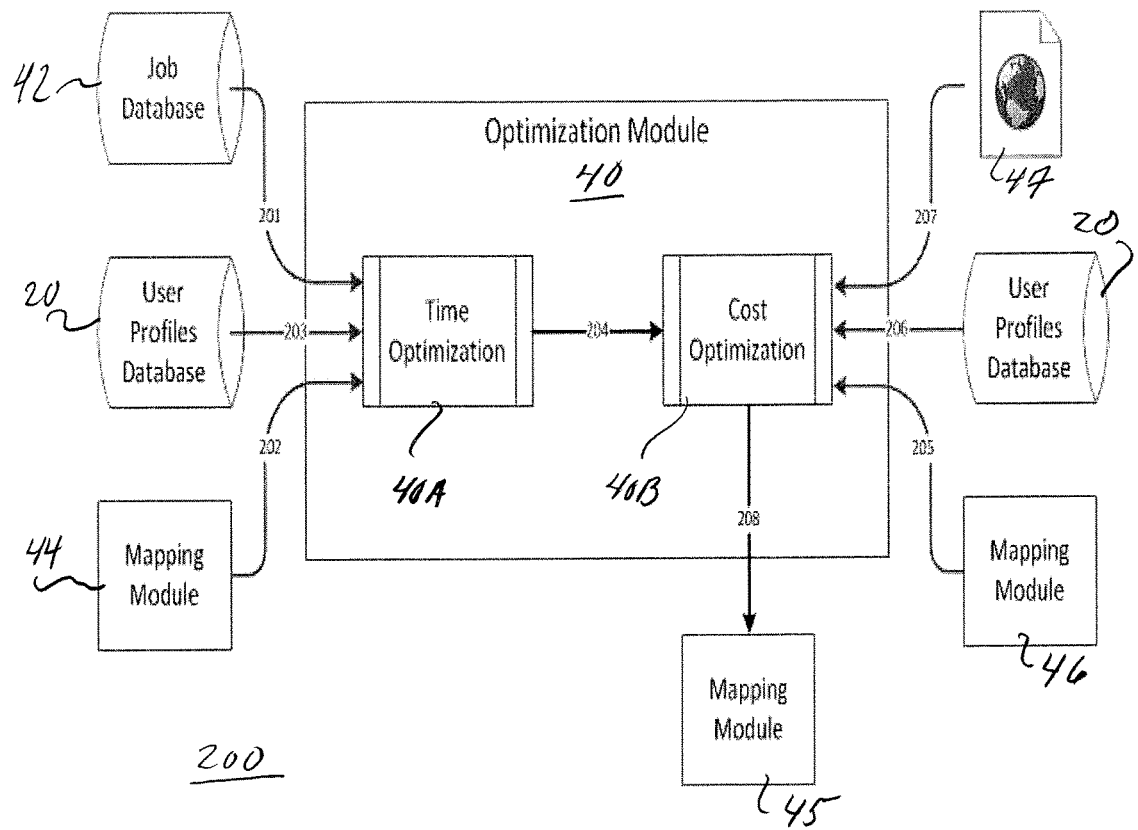
FIG. 2 is a block diagram of an exemplary route optimization module, illustrating operation of an algorithm for determining the availability of qualified driver, total driving times, mandatory rest stops, based on the shipment origin and destination according to the teachings herein.

A closer review of optimization module 40 and its functionality within system 10 is illustrated in FIG. 2. In particular, FIG. 2 illustrates a block diagram 200 of the route optimization module utilizing an algorithm for determining the availability of qualified driver(s), total driving times, mandatory rest stops, based on the shipment origin and destination. In this example embodiment, module 40 includes a time optimization submodule 40A and a cost optimization submodule 40B. Time module 40A receive inputs from job database 42, user profile database 20 and mapping module 44 and transmits it processed output to cost module 40B. Cost module 40B processes the input from the time module and inputs from a shipper or vendor and mapping module 46 and generates a more cost effective vehicle asset and route optimization plan and outputs the result to a mapping module 45.

As a process flow, at step 201 shipment origination and destination information is received for users along with user preferences and at step 202 route options along with total driving time and driver substitution breakpoint locations are obtained from the mapping module 44. At step 203 vehicle information is obtained from user profile database 20 and multiple driver substitutions are selected based on the vehicle owner criteria. At step 204 multiple route options are sent to cost optimization sub-module 40B depending on vehicle owner's preference (either minimize cost or time or both). At step 205 minimum fuel costs, tolls, weather, road conditions, historical congestion info, are all figured in to the calculation, which are obtained from mapping module 46. At 206 driver wages are obtained from the user database 20 and at 207 insurance quotes are obtained from Insurance company websites. Finally, at step 208 all route options with total cost sent to mapping module 45.

Mapping Module-Sub-Module 1

Figure 3A:
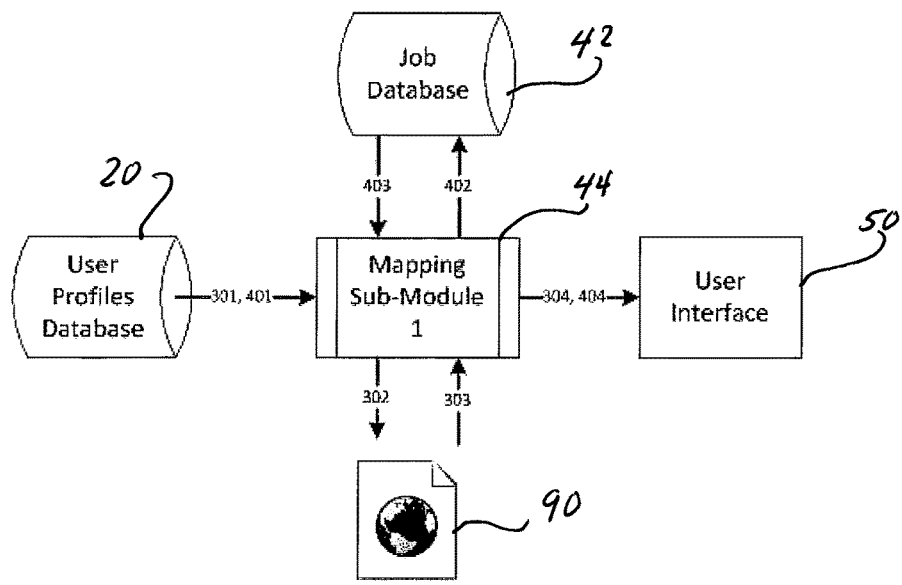
FIG. 3A is a block diagram of an exemplary route optimization module, illustrating operation of an algorithm for cost minimization based on the availability of a qualified driver, total driving times, mandatory rest stops, and based on the shipment origin and destination.

Referring now to FIG. 3A, there is illustrated a block diagram 300 of a process flow of optimization module 40 illustrating operation of an algorithm for cost minimization based on the availability of a qualified driver, total driving times, mandatory rest stops, and based on the shipment origin and destination. At step 301 tracking system information is obtained from the user profiles 20 (driver, vehicles) from devices or system such as a GPS enabled tracker or mobile phone (or smart device) triangulation and at step 302 the tracking data is sent to a Mapping API 90 (like Google® maps, Bing® maps, etc.). At step 303 real-time tracking information received at mapping module 44 and at step 304 such tracking information is sent to a user. Next at step 401 user automated search preferences are received from the user profiles database 20 and at 402, for vehicle owners, job database 42 is accessed for driver requirements. For drivers, at 402, job database 42 is accessed to check for open engagements based on driver search criteria. At steps 403 and 404 vehicle owners are alerted about available drivers and drivers alerted about open engagements.

Mapping Module-Sub-Module 2

Figure 3B:
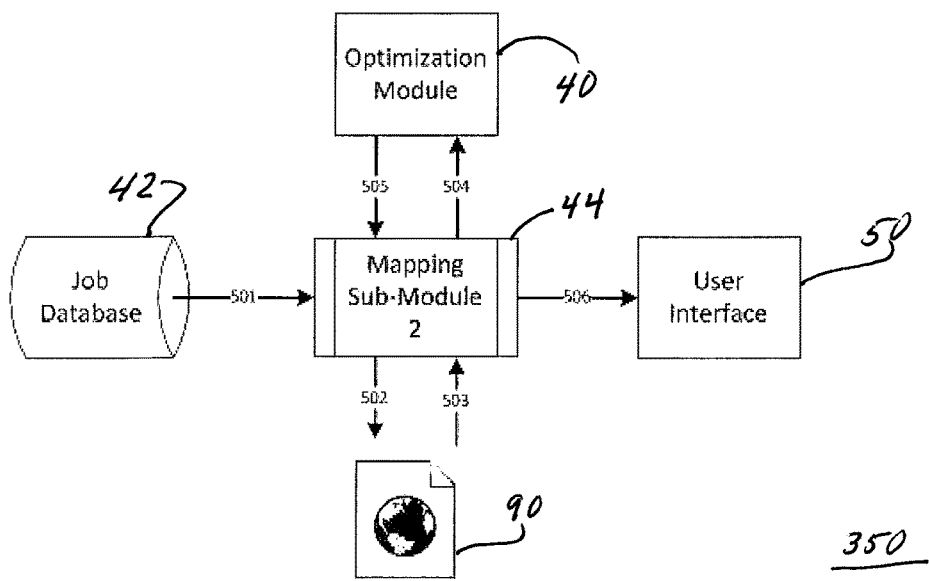
FIG. 3B is a block diagram of an exemplary mapping optimization algorithm operation for determining the availability of a qualified driver, total driving times, mandatory rest stops, and based on the shipment origin and destination.

Referring now to FIG. 3B, there is illustrated is a block diagram 500 of a process flow of a mapping optimization algorithm operation for determining the availability of a qualified driver, total driving times, mandatory rest stops, and based on the shipment origin and destination. At step 501 trip origin destination information is received from the job database 42 and at step 502 an inquiry is sent to get best route options, breakpoint locations, refuel locations, tolls, etc. to a mapping application 90 (Google® maps, Bing® maps, etc) and external webpages are accessed to get this information. At step 503 information is received from mapping module 44 and at step 504 information sent to optimization module 40. At step 505 routes matching the search criteria are received at mapping module 44 along with total costs and at step 506 route options are displayed to the user at user interface or a display such as display 60 or a smart device.

Shippers/Manufacturers

Manufacturers are also beneficiaries of the optimization capabilities of various embodiments described herein of system 10. Manufacturers may reduce, potentially significantly, their turn-around times and transportation costs, and in turn, substantially reduce their operational costs. System 10 also provides for reliable driver selection options so they can have better service at a lower cost.

Figure 4:
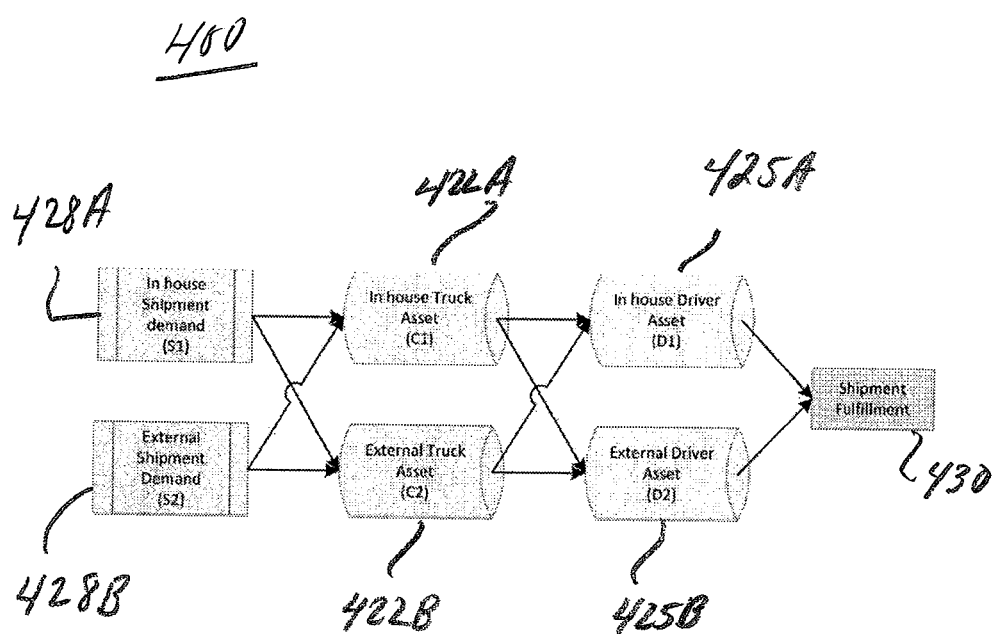
FIG. 4 is a diagram of a shipment fulfillment module integrating vehicle, driver and shipping demands according to the teachings herein.

Referring now to FIGS. 4 and 5 there are illustrated a diagram of a shipment fulfillment module 400, and its associated process, and an example computer screenshot 500 of shipping codes, for integrating vehicle, driver and shipping demands to fulfill a shipping order 430. In practice, module 400 incorporates inputs for both internal 428A and external 428B shipping demands; internal 422A and external 422 truck assets and availability; and internal 422A and external 422 truck driver availability that are processed in a system such as system 10 in order to fill shipping order 430. Specifically, as illustrated in FIG. 5 in a screenshot, various shipping code combinations can be derived from the shipment fulfillment module and system 10 in trying to select to most optimal truck asset, driver with shipping demand.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A system for vehicle use and route optimization for a vehicle traveling from a first location to a second location, the system comprising:
   a controller configured to receive a plurality of data inputs from one or more databases initiated by a user, the controller including an optimization module, a mapping module and a memory module having stored therein a vehicle profile database, a driver profile database, and a route inquiry database, the controller further including a configurable driver time limiting module and a node assignment module for assigning one of an originating and arrival geographic location node along a route defined by the first and second location for at least one of a driver substitution and equipment exchange;
   a user input device operatively coupled to the controller for receiving a vehicle data input, a driver data input and a route inquiry data input from the user; and
   a visual display unit operatively coupled to the controller and the user input device for displaying any one output data from any one of the user input device and the controller; wherein the controller initiates the optimization module to generate at least one vehicle route, at least one driver route with integrated driver time limit and at least one geographic node along one of the vehicle and driver route.

2. The system of claim 1, further comprising a jobs database operatively coupled to the controller for providing data inputs to the controller for a shipment or transportation job including origination and destination points, cargo size and target cost for the job.

3. The system of claim 1, further comprising a contracts module operatively coupled to the controller for generating a detailed terms and conditions proposal for job bidding between any one of a vehicle owner, a driver and a shipper.

4. The system of claim 3, further comprising a payment module operatively coupled to the controller for generating a payment transaction plan for job bidding between any one of a vehicle owner, a driver and a shipper.

5. The system of claim 1, further comprising a shipper/manufacturers module operatively coupled to the controller for providing data inputs to the controller for at least one shipping job including origination and destination points, cargo size and target cost for the job.

6. The system of claim 1, wherein the optimization module generates a displayable output on the visual display that includes one of at least one of a matching set of the vehicle route and the driver route proposal and a prioritized list of matching sets of vehicle route and driver route proposals.

7. The system of claim 1, wherein the controller includes at least one server operatively coupled to a network selected from the group consisting of an Ethernet network, a cloud-based network and a cellular or satellite communications network.

8. The system of claim 1 further comprising a time optimization module integrated in the optimization module for providing route, driver and vehicle proposals with reduced transportation downtime between the first location and the second location of a selected job from the jobs database.

9. The system of claim 8, further comprising a cost optimization module integrated in the optimization module for providing route, driver and vehicle proposals with reduced transportation costs between the first location and the second location of a selected job from the jobs database.

10. The system of claim 1, further comprising at least one sensor operatively coupled to the controller, the at least one sensor selected from the group consisting of a driver cabin sensor, a trailer volume capacity sensor and a trailer movement sensor.

11. The system of claim 10 wherein the sensor comprises a smart device operatively coupled to the controller via a cellular communications network.

12. The system of claim 1 further comprising a carrier and driver ratings module for integrating into the optimization module input ratings from users to be integrated in vehicle and route optimization proposals generated by the controller.

13. The system of claim 1 further comprising any one or more of the following modules for integrating into the optimization module input ratings from users to be integrated in vehicle and route optimization proposals generated by the controller, wherein the modules are selected from the group consisting of an vehicle, driver and asset liability insurance module, a driver moving violations module, a driver background check module, and a vendor and shipper credit rating module.

14. A method for optimizing individual vehicle use and optimizing a route for a vehicle traveling from a first location to a second location, the method comprising the steps of:

providing a controller configured to receive a plurality of data inputs from one or more databases initiated by a user, the controller including an optimization module, a mapping module and a memory module having stored therein a vehicle profile database, a driver profile database, and a route inquiry database, the controller further including a configurable driver time limiting module and a node assignment module for assigning one of an originating and arrival geographic location node along a route defined by the first and second location for one of a driver substitution and equipment exchange;

inputting a vehicle data input, a driver data input and a route inquiry data into a user input device operatively coupled to the controller; and displaying at a visual display unit operatively coupled to the controller and the user input device at least one vehicle route, at least one driver route with integrated driver time limit and at least one geographic node along one of the vehicle and driver route received from the controller.

15. The method of claim 14 further comprising configuring the driver time and node assignments to facilitate short trip legs based on time and energy limitations for alternative fuel vehicles that include electric, ethanol and natural gas.

16. The method of claim 14 further comprising generating a contract proposal for between users after a proposed route, driver and equipment proposal has been accepted.

17. The method of claim 16, further comprising generating a payment plan between parties to the contract after contract acceptance.

18. The method of claim 14, further comprising generating a route, vehicle and driver plan in response to a job inquiry via a time optimize module based on reduced transportation time between the first and second locations.

19. The method of claim 18, further comprising generating a route, vehicle and driver plan in response to a job inquiry via a cost optimize module based on reduced transportation cost between the first and second locations.

20. The method of claim 14, further comprising the step of providing at least one sensor operatively coupled to the controller, the at least one sensor selected from the group consisting of a driver cabin sensor, a trailer volume capacity sensor and a trailer movement sensor.

* * * * *